United States Patent [19]

Takaragi et al.

[11] Patent Number: 4,885,788

[45] Date of Patent: Dec. 5, 1989

[54] IC CARD

[75] Inventors: Kazuo Takaragi, Yokohama; Takayoshi Shiraishi, Chigasaki; Ryoichi Sasaki, Fujisawa, all of Japan

[73] Assignee: Hitachi, Ltd., Tokyo, Japan

[21] Appl. No.: 13,800

[22] Filed: Feb. 12, 1987

[30] Foreign Application Priority Data

Feb. 17, 1986 [JP] Japan .................................. 61-30815

[51] Int. Cl.$^4$ ............................................. H04L 9/00
[52] U.S. Cl. ......................................... 380/23; 380/25; 235/382
[58] Field of Search ...................... 380/23, 25, 24, 45, 380/47, 39, 48; 235/380, 382; 364/405

[56] References Cited

U.S. PATENT DOCUMENTS

| | | | |
|---|---|---|---|
| 4,204,113 | 5/1980 | Giraud et al. | 235/380 |
| 4,211,919 | 7/1980 | Ugon | 380/23 |
| 4,256,955 | 3/1981 | Giraud et al. | 235/380 |
| 4,423,287 | 12/1983 | Zeidler | 380/24 |
| 4,438,824 | 3/1984 | Mueller-Schloer | 380/23 |
| 4,450,535 | 5/1984 | dePommery et al. | 364/405 |
| 4,453,074 | 6/1984 | Weinstein | 235/380 |
| 4,458,109 | 7/1984 | Mueller-Schloer | 380/23 |
| 4,467,139 | 8/1984 | Mollier | 380/23 |
| 4,549,075 | 10/1985 | Saada et al. | 380/25 |
| 4,575,621 | 2/1986 | Dreifus | 235/380 |
| 4,601,011 | 7/1986 | Grynberg | 380/23 |
| 4,638,120 | 1/1987 | Herve | 380/23 |
| 4,650,975 | 3/1987 | Kitchener | 235/380 |
| 4,656,474 | 4/1987 | Mollier et al. | 380/23 |
| 4,709,136 | 11/1987 | Watanabe | 235/380 |
| 4,712,177 | 12/1987 | Schrenk | 235/380 |
| 4,727,244 | 2/1988 | Nakano et al. | 235/380 |
| 4,731,842 | 2/1988 | Smith | 380/24 |
| 4,758,718 | 7/1988 | Fujisaki et al. | 235/380 |
| 4,802,218 | 1/1989 | Wright et al. | 380/23 |

Primary Examiner—Salvatore Cangialosi
Attorney, Agent, or Firm—Antonelli, Terry & Wands

[57] ABSTRACT

An IC card having an authentication code which is compared with an authentication code obtained by processing data recorded on the IC card, and permitting the IC card to be used only when agreement is found.

4 Claims, 5 Drawing Sheets

FIG. 6

| | | |
|---|---|---|
| POSSESSOR | PERSONAL IDENTIFICATION NUMBER | 111 |
| | PERMISSION LEVEL OF INFORMATION REFERENCE | 112 |
| REGISTERED DOCTOR 1 | LICENSE CODE OF PRACTICE MEDICINE | 113 |
| | PERSONAL IDENTIFICATION NUMBER | 114 |
| | PERMISSION LEVEL | 115 |
| | AUTHENTICATION CODE | 117 |
| ... | ... | |
| REGISTERED DOCTOR N | LICENSE CODE OF PRACTICE MEDICINE | 113 |
| | PERSONAL IDENTIFICATION NUMBER | 114 |
| | PERMISSION LEVEL | 115 |
| | AUTHENTICATION CODE | 117 |
| | PERMISSION LEVEL OF INFORMATION REFERENCE FOR NON-REGISTERED DOCTOR | 116 |

| DATA A | DATA B |
|---|---|
| 141 | 142 |

140

IC CARD

BACKGROUND OF THE INVENTION

The present invention relates to electronic shopping, electronic check books, credit cards and the like, and particularly to an IC card which is adapted to preventing data alteration, forgery and the like among the traders.

The IC card which consists of a plastic card in which an IC (integrated circuit) is embedded has functions for identifying the individual person and for making forgery difficult, and has a large memory capacity. Such a card finds application in electronic settlement, personal information files, security control and the like.

When a person goes shopping in supermarkets and department stores using an IC card, it is desirable from the standpoint of privacy that a list of purchases made in one store not be readable in other stores in which the person makes another purchase. For this purpose, the IC card should be provided with transaction areas that are different depending upon the store, so that one store is not allowed to make reference to the transactions of other stores.

A first problem in the conventional art is that, there had been proposed neither a method of protecting a plurality of transaction areas in the same IC card by different encipher keys nor a key control method suited for this purpose.

Among the public key cipher systems, on the other hand, a master key exists in the RSA method and in the Rabin method. Using the master key, the above-mentioned key control can be effectively carried out.

A second problem in the conventional art is that consideration has not been given in regard to forgery of the IC card, and alteration or forgery of data in the card.

A third problem is that the conventional IC card has been fabricated based on a prerequisite that it be used by an individual person (see Nikkei Computer, "Will the Age of IC Card Come?", July 8, 1985). Health management data, property management data and like data may be input to the IC card to utilize them. In addition to the situation where the user himself keys in the personal identification number to obtain the desired data, however, it may often happen that a medical doctor or a bank employee keys in another personal identification number to take out all or part of the desired data, such as in an emergency.

SUMMARY OF THE INVENTION

A first object of the present invention is to provide an IC card which is capable of protecting the data in different transaction areas in the IC card.

A second object of the present invention is to provide an IC card which makes it possible to detect forgery of the card, or alteration or forgery of data in the card such as a cashless shopping credit card.

A third object of the present invention is to provide an IC card which permits the user of the card to take out the data and which also permits only a limited number of persons to take out the data in case of an emergency.

In order to achieve the above first object, the present invention carries out the below-mentioned processing in writing data onto, or in reading data from, the transaction areas of the IC card.

(i) The IC card administrator prepares in advance sets of encipher keys and decipher keys for a number of the transaction areas that are to be kept secret, and prepares a master decipher key for all of the decipher keys.

(ii) The IC card administrator assigns an encipher key code and a decipher key code for each of the transaction areas, writes an available upper-limit amount of money and the encipher key code or the decipher key code on a portion of the corresponding transaction area, and encrypts the transaction area using the encipher key.

(iii) The IC card administrator hands the IC card over to the user. The IC card administrator further hands the encipher keys and the decipher keys to the respective individual stores so that they can encrypt and decipher the transaction areas.

Owing to the above-mentioned procedures (i) to (iii), different encipher keys and decipher keys are held by the different stores. Therefore, a given store is permitted to process only the transaction areas that correspond to the encipher key and the decipher key held by that store from among the plurality of transaction areas contained in the IC card. This makes it possible to protect the privacy of the user. The IC card administrator holds the master decipher key which is capable of deciphering all of the transaction areas in the IC card. Therefore, the master decipher key can be used should the individual decipher keys be lost. Furthermore, the master decipher key need not be used for the transactions, and can be safely administered.

In order to achieve the above second object, furthermore, the data in the card are detected by checking the balance and by checking a data alteration detection code to detect the alteration or forgery of data. Further, data alteration or forgery in the store transaction file or in the bank transaction file, is checked by collating the data alteration detection code and the IC card data.

A data alteration detection circuit in principle resembles the algorithm of a code error detection circuit, and can be implemented by using a crytograph apparatus and feeding the output thereof back to the input thereof.

To achieve the above third object, furthermore, a microprocessor for the IC card determines the permitted access relying upon the personal identification number (codes are also acceptable in addition to numerals) that is input, and an accessible data region is determined to output the permitted data.

BRIEF DESCRIPTION OF THE DRAWINGS

FIG. 6 is a diagram illustrating the data structure in a ROM; and

FIG. 7 is a diagram illustrating the data structure in an EEROM.

DETAILED DESCRIPTION OF THE PREFERRED EMBODIMENTS

Figure 1A:
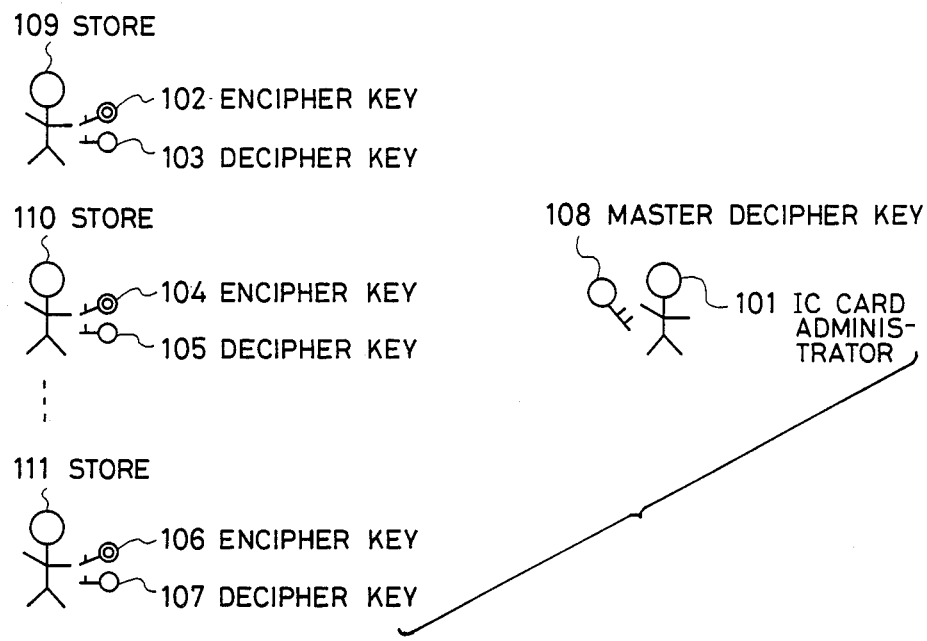
FIGS. 1A and 1B are block diagrams showing the structure of an IC card according to a first embodiment of the present invention.
Figure 1B:
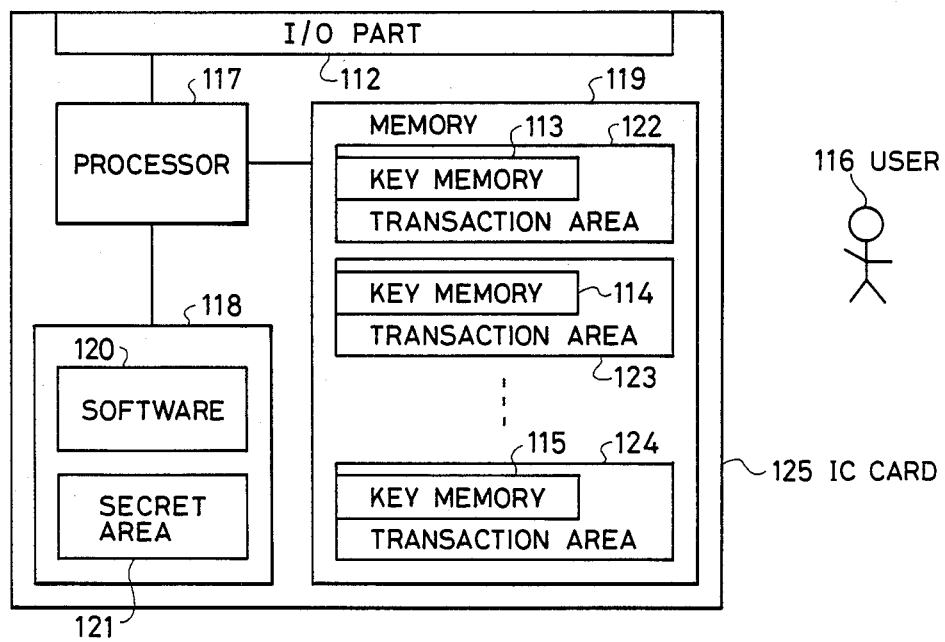
Figure 2:
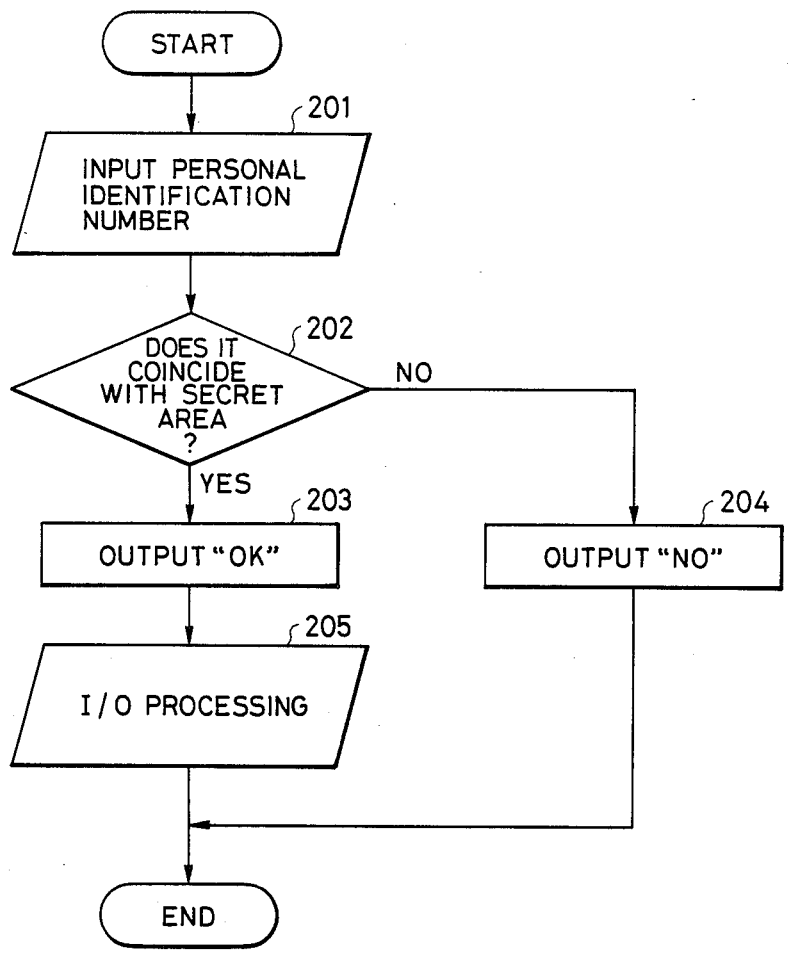
FIG. 2 is a flow chart of an operation when a user makes a purchase in a store using the IC card.

FIGS. 1A and 1B show the manner of structuring an IC card and FIG. 2 shows the structure of the IC card, according to a first embodiment of the present invention.

First, preparation is carried out as described below.

An IC card administrator 101 prepares sets (102, 103), ..., (106, 107) of encipher keys and decipher keys, prepares a master key 108 for the decipher keys 103, ..., 107, and retains the master key 108 in a secure place. Thereafter, the IC card administrator 101 hands the sets (102, 103), ..., (106, 107) of encipher keys and decipher keys over to the stores 109, ..., 111. The IC card administrator, further, writes an available upper-limit amount of money onto the transaction areas 122, ..., 124 of the IC card 125. The IC card administrator then encrypts the sets (102, 103), ..., (106, 107) of encipher keys and decipher keys with an encipher key code that corresponds to each of the cards, and writes each of the sets onto each of the key memories 113, ..., 115 of the IC card 125, and then encrypts authentication codes corresponding to data written on each of the transaction areas with an encipher key code that corresponds to each of the cards and writes them down. The IC card administrator then hands the IC card 125 over to a user 116.

Here, the authentication code refers to data written on the transaction areas, that are compressed. For instance, use is made of a MAC (message authentication code) of U.S. ANSI Bank Association Message Authentication Standards (FIMAS).

The data are written into a memory 119 and are read out from the memory 119 by driving a processor 117 under the control of software 120 contained in a ROM (read-only memory) 118 via an I/O part (input and output part) 112.

FIG. 2 is a flow chart for processing the IC card when the user 116 makes a purchase in a store 109.

201: The user inputs his personal identification number into the processor 117 via I/O part.

202: The processor 117 draws the personal identification number from a secret area 121 under the control of software 120.

203: The processor 117 produces, via I/O part, a signal "OK" when the personal identification number applied by the user 116 is in agreement with the personal identification number contained in the secret area, and produces a signal "NO" when they are not in agreement.

204: When the signal "NO" is produced, the processor 117 does not write data or does not read data until the signal "OK" is next produced.

205: When the signal "OK" is produced, the store 109 updates the contents of the transaction area 122, using the encipher key 102 and decipher key 103, depending upon the items which the user 116 has purchased.

Updating of the contents of the transaction area will now be described. The code of decipher key 103 is applied to the IC card via I/O part 112 by the store 109, and the data in the key memory 113 is deciphered. Then, it is confirmed whether an authentication code contained in the deciphered data is in agreement with an authentication code that is calculated from the data of the transaction area 122. After they are confirmed to be in agreement, the transaction area 122 and the authentication code are updated depending upon the purchase and, then, the key memory 113 is encrypted with the above encipher key code.

When it is found that the authentication codes are not in agreement, the IC card produces a signal to inform the store 109 of this fact so that the store 109 may follow the necessary procedure to inhibit the purchase.

Next, described below is an example of shopping using an IC card according to a second embodiment of the present invention.

In this example of shopping, illegal acts may be done by altering the data in the card, such as altering the data of cash receipts from a bank and altering the data of sales and purchases.

Figure 3:
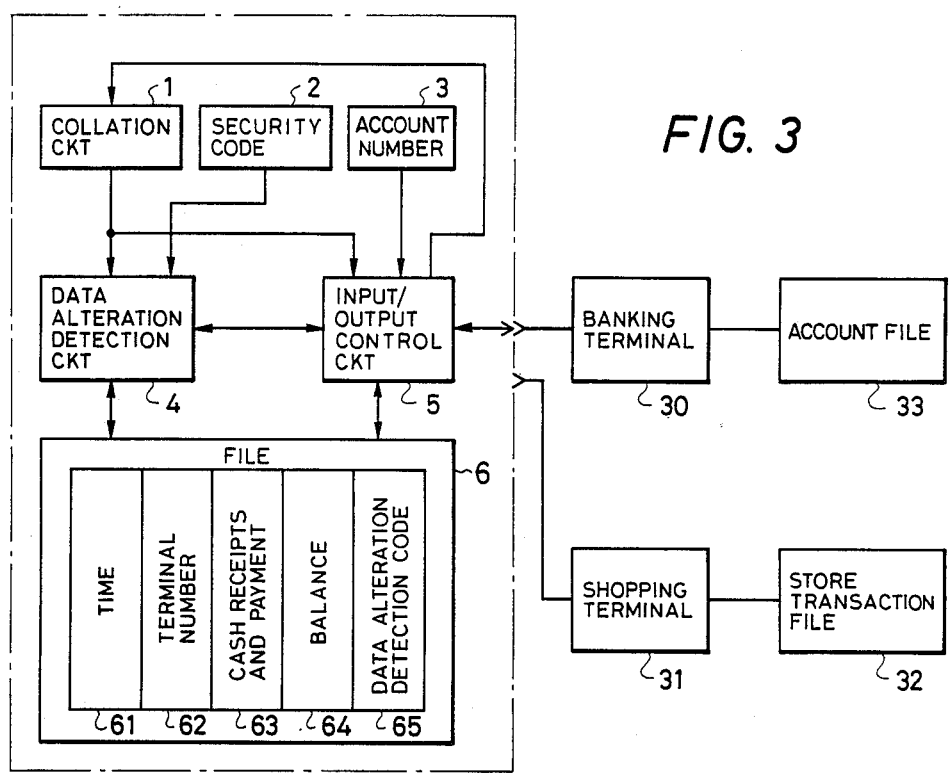
FIG. 3 is a block diagram showing the structure of an IC card according to a second embodiment of the present invention.

FIG. 3 is a block diagram of the IC card for preventing this sort of illegal activity.

Figure 4:
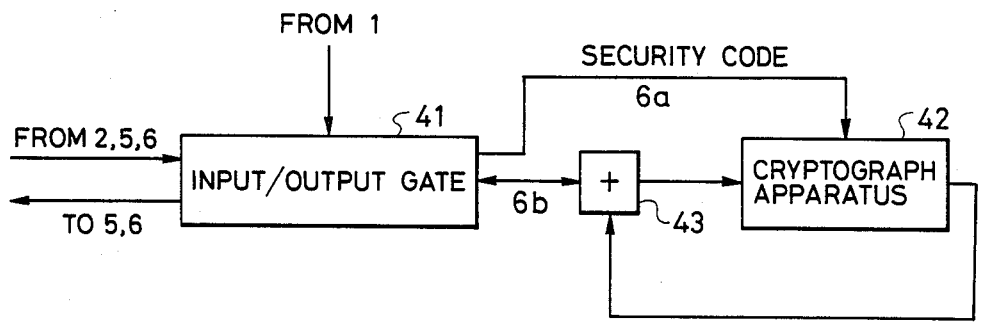
FIG. 4 is a block diagram showing the structure of the data alteration detection circuit in the IC card.

The IC card process is not allowed to proceed to the next operation unless the user of the IC card is confirmed by a collation circuit 1 relying upon a password or the like. A security code 2 has been written on a read-only memory which cannot be directly read from the external side. An account number 3 has also been written in the read-only memory. A data alteration detection circuit 4 forms an encrypted authentication code by feeding the output of a cryptograph apparatus back to the input side thereof as shown in FIG. 4. That is, if the data 61, ..., 64 to be authenticated are altered and are input as data 6 of FIG. 4, effects of bits of the altered data are successively propagated forward, and a code 65 is formed that is different from the original code. Therefore, the fact of alteration is detected.

An input/output control circuit 5 is an interface circuit between the IC card and the terminals 30, 31 for the card. A data file 6 is concerned with input times, terminal numbers, cash receipts and payments, balance, data alteration detection code and the like.

First, to write the cash receipt onto the card, the card is set to a banking terminal 30, and a password is input from the keyboard. The password is input through the input control circuit 5 and is collated with the code in the circuit by the collation circuit 1, to make sure that the user is a person who is authorized to possess the card. If the collated result is acceptable, the account number is sent to the input/output control circuit 5 in response to a signal from the collation circuit 1. An account file is then opened at the banking terminal. As the cash receipt data is input to the card from the keyboard, a security code at the terminal is input to the card together with the cash receipt, time, balance, and terminal number. In the card, the data that has passed through the input control circuit is sent to the data alteration detection circuit 4 which obtains a data alteration detection code by giving the time, terminal number and cash receipt as inputs to the cryptograph apparatus with the security code of the card and security code of the terminal as keys. These data are written into file 6 and are, at the same time, written into the account file. The security code of the terminal is recorded on the security code area 2 of the card. Here, the security code area is a memory region equipped with means to protect the data, using hardware and software manners so that the data will not be available to an outsider or the data may not be written by an outsider.

To do shopping in a store, the card is connected to a shopping terminal 31, and a password is input through the keyboard at the shopping terminal 31. If a proper password is applied, the shopping terminal reads the balance from the card. After the balance is checked, therefore, prices of the purchased merchandise are input through the keyboard at the terminal 31. As the cash payment, time, balance, shopping terminal number and security code at the terminal are input as described earlier, the data alteration detection circuit 4 in the card receives time 61, terminal number 62, cash receipts and payment 63 and balance 64 as inputs to obtain a data alteration detection code 65 with the security codes of the card and terminal as keys. These data are written on the file 6 and are, at the same time, written on the store transaction file 32 together with the account number recorded in the bank account number via the shopping terminal 31.

The store transaction file 32 is transferred to the bank, sorted by account numbers, and is written onto the account file 33.

As the balance becomes small and the user writes cash receipts onto the card again, the user sets the card to the banking terminal 30 and inputs the password. If the password is acceptable, file of the card can be read out from the banking terminal 30. The banking terminal reads the account number from the card and opens an account file in which have already been written the data from the store. Therefore, permissible or impermissible use of the card is discriminated by collating the file of the card with the account file and by checking the balance.

If both records are correct, the records are erased from the card file.

If the records are all acceptable, the bank transfers the amount of money which the customer has spent to the store. The balance is calculated in the bank.

To check the balance, cash payments 63 due to each purchase are subtracted from the initial balance of the card file, and the subtracted result is collated with the balance 64.

When the records are not in agreement, the security code at the terminal is read out for each of the records from the bank file relying upon the terminal number 62 of the records. The security code and the record are then input to the card to obtain a data alteration detection code from the card. The collating of this code with the data alteration detection code of the previous record of the card or of the bank file is referred to as the checking of detection code.

It is now presumed that a record is not in agreement, the content of the record that is not in agreement being the time. In this case, the record of a time that is in agreement with any one of the records is found from the card file and the bank file.

(a) The IC card contains no corresponding record, and the detection code check of the bank record and the balance check are correct. In this case, the card does not contain a record, and it is assumed that the record is erased from the IC card.

(b) The IC card contains no corresponding record, and the detection code checking of the bank record is not acceptable. In this case, the record was added on the side of the bank, and it is considered that the record was unfairly added to the bank file.

The same determination can also be rendered even when the record on the side of the bank contains no corresponding record.

Next, when the record is not in agreement, the content of the record that is not in agreement being the terminal number and the cash receipts and payments, proper use or improper use is determined by checking each of the detection codes.

Further, when the record is not in agreement, the content thereof being the balance, proper or improper use is determined by checking each of the balances.

It is also possible to use numbers such as serial numbers instead of the time data.

According to the above-mentioned embodiment of the present invention, it is possible to detect the alteration of data in the IC card and in the bank file.

The IC card according to a third embodiment of the present invention will now be described in conjunction with FIGS. 5 to 7.

Figure 5:
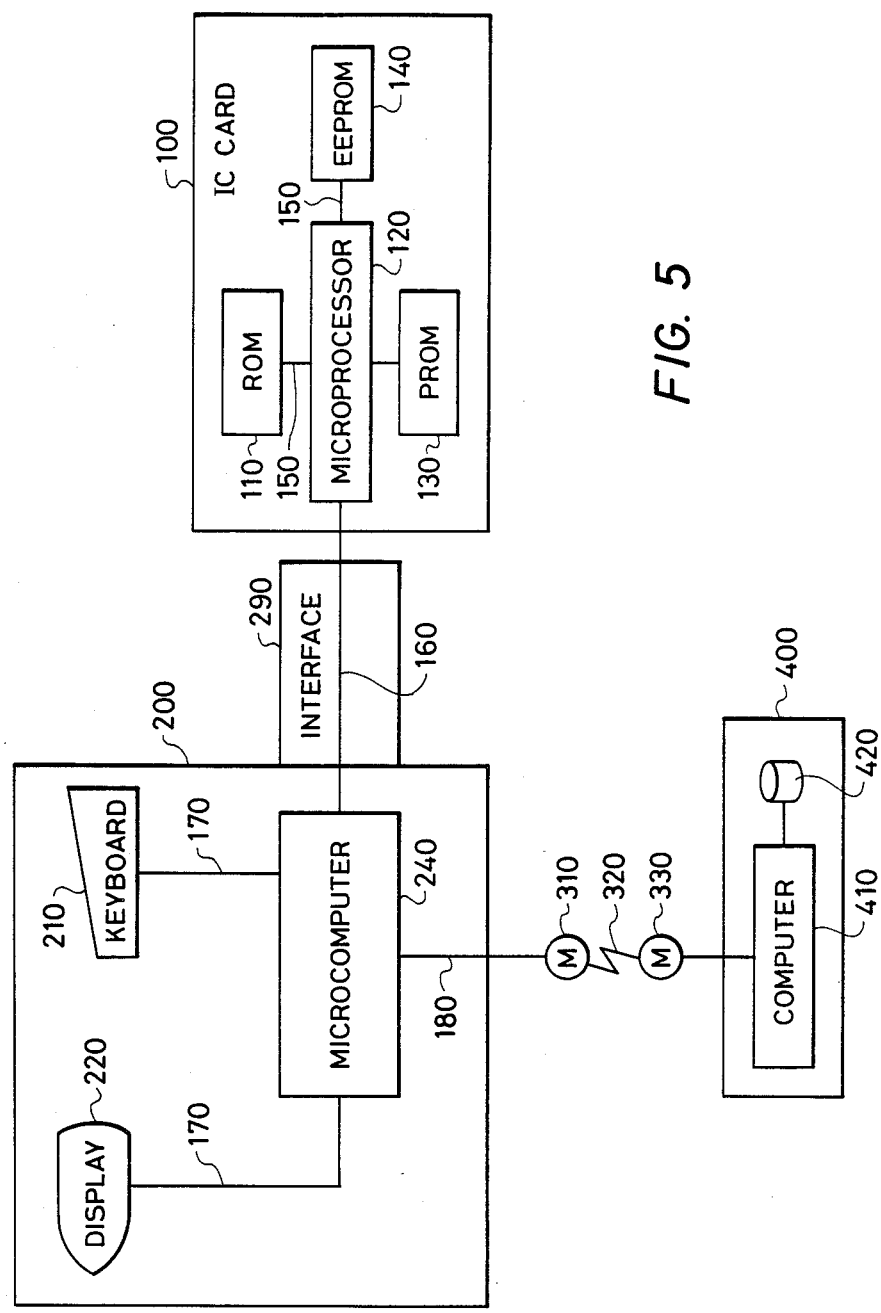
FIG. 5 is a block diagram showing the structure of an IC card according to a third embodiment of the present invention in an IC card system for health management data.

FIG. 5 is a diagram which schematically illustrates the structure of an IC card system for health management data, wherein the IC card 100 is connected to a terminal 200 for the IC card via an interface 290, to exhibit the functions of the IC card.

The IC card 100 consists of a microprocessor 120, an ROM (read-only memory) 110, a PROM (programmable read-only memory) 130, and an EEPROM (electrically erasable programmable read-only memory) 140, which are connected together via signal lines 150. As the IC card 100 is connected via a signal line 160 to the terminal 200 for IC card, a program in the PROM 130 is loaded in the microprocessor 120 so that it can be used.

The terminal 200 for the IC card consists of a microcomputer 240, a keyboard 210 and a display 220, that are connected together through signal lines 170. The microcomputer 240 is further connected to a data management center 400 via a signal line 180, a MODEM 310, a public telephone line 320 and another MODEM 330. The data management center 400 consists of a computer 410 and a data base 420.

A possessor of the IC card 100 may visit a doctor who is not his family physician, and properly inputs his personal identification number through the keyboard 210. The signal is then sent to the microprocessor 120 in the IC card via the microcomputer 240 on the side of the terminal 200. The microprocessor 120 searches through the ROM 110.

Here, the ROM 110 has a data structure as shown in FIG. 6. That is, the data structure consists of a personal identification number 111 of the possessor of the IC card 100, a permission level 112 of information reference of the possessor, license codes 113 of the medical practice of the registered doctors, their personal identification numbers 114, their permission levels 115 of information reference, authentication codes 117 of the data of the registered doctors, and a permission level 116 of information reference for non-registered doctors.

If the microprocessor 120 which searches through the ROM 110 indicates that the personal identification number that is input is in agreement with the personal identification number 111 of the possessor, the permission level 112 of information reference is read out. It is presumed that there exists only one level 1. Based upon this level, the microprocessor 120 reads the data file in the EEPROM 140.

FIG. 7 illustrates a data structure in the EEPROM 140. Here, it is presumed that the data A (accessible with level 1 and level 2) 141 and the data B (accessible with level 1 only) 142 are contained in the EEROM 140. For instance, the data A 141 contains data necessary for the diagnosis and therapy, such as blood type, diagnosis result of medical examination, medical history, and the like. The data B 142 contains such data as family structure and the like, that have no direct relation to the diagnosis or therapy, as well as those data which the possessor of the card may not wish to have known to other persons without his permission.

In this case, the level 1 is given by the microprocessor 120 to make access to the data A 141 and the data B 142. The data are sent from the microprocessor 120 to the microcomputer 240 for terminal, 200 subjected to processing for display, and are displayed on the display unit 220. The data are also displayed for the doctor to be utilized for the diagnosis and therapy. Part of the results is also input through the keyboard 210, and is written onto the data A 141 or the data B 142 in the EEPROM 140 via microcomputer 240, microprocessor 120 and the like.

Here, it may happen that the possessor of the IC card 100 needs emergency therapy due to, for example, a traffic accident, the possessor not being able to input his personal identification number by himself. In this case, the doctor inputs the code of his license code of practice medicine and his personal identification number through the keyboard 210. The input results are sent to the microprocessor 120 in the IC card 100 via the microcomputer 240. The microprocessor 120 prepares an authentication code with the personal identification number 114 as a key and with the file data of the registered doctor as an input data, determines whether the thus prepared authentication code is in agreement with the authentication code 117 that is written in the file data, compares the license code 113 for the practice of medicine and the personal identification number 114 of the registered doctor in the ROM 110 with the license code for the practice medicine and the personal identification number that are input. When they are in agreement, the microprocessor 120 reads the permission level 115 of information reference and reads the data that meets the permission level from the EEPROM 140. The result is displayed on the display unit 220 via microprocessor 120 and microcomputer.

When the license code for the practice of medicine is found on the corresponding ROM 110 but when the personal identification number is not in agreement, this fact is displayed on the display unit 220, and the processing is completed.

When even the license code for the practice medicine is not found on the ROM 110, the license code for the practice of medicine and the personal identification number input by the doctor are sent to the data management center 400 where the computer 410 performs the collation with regard to whether the data base contains data that are in agreement with the license code for the practice of medicine and the personal identification number. If the two are in agreement, a secret code which indicates the agreement is sent to the IC card 100 via microcomputer 240 and the like. The IC card 100 takes out the data depending upon the permission level 116 of information reference for non-registered doctors, and displays the data on the display unit 220.

When the license code of for the practice of medicine or the personal identification number of the doctor that is input is not in agreement, this fact is displayed on the display unit 220, and the processing is completed.

To avoid accidental agreement that might occur when the data are input many times, it is allowable to provide such a countermeasure that repeated access is not permitted in case an incorrect personal identification number is input more than M times (M is a predetermined number). When access is made to the data management center, furthermore, it can be contrived to leave the license code for the practice of medicine, the data and time, and the possessor of the card in the data base of the data management center as a data log.

In the foregoing were described the cases where separate contents were stored in the ROM 110 and EEPROM 140. The contents, however, may be stored together in the EEPROM 140. Furthermore, a RAM (randam access memory) may be employed instead of the EEPROM provided the data are stored without being erased.

The foregoing embodiments have dealt with the cases where there were two permission levels of information. However, it does not needs to be pointed out that there may be three or more permission levels of information.

Further, though the above description has dealt with the IC card system for health management data, the invention can also be adapted to an IC card system for property management data and like systems where a third person who is qualified is allowed to make access to the data in an emergency case.

The following advantages are obtained from the system of the present invention in which a banking organ plays the role of an IC card administrator and issues an IC card for a user so that he is allowed to utilize a plurality of stores.

(1) Protection of privacy: Data such as the name of merchandise and the amount of money are encrypted with encipher key codes that are different for each of the stores, and are written onto the IC card. Therefore, the situation in which the card is used in one store is kept secret for other stores, and privacy of the user is protected.

(2) Easiness of key administration: The IC card administrator, who has a master decipher key for a user, is allowed to decipher all data contained in the IC card. The IC card administrator requires less labor for key administration in settling the amounts of money spent as recorded in the IC card.

(3) Safety of key administration: The master decipher key is administered by the IC card administrator only, and the number of times access is required is relatively small. Therefore, the master decipher key can be safely administered. Further, in case the store has accidentally lost the encipher key or the decipher key, the encipher key code or the decipher key code in the IC card can be easily taken out using the master decipher key.

(4) It is possible to detect alteration or forgery of data in the IC card and in the bank file.

(5) In an emergency case, a third person who is qualified is allowed to make access to the data and use the data, on behalf of the possessor of the IC card.

(6) The level of data for making access is permitted can be divided, so that the data are taken out within a range of a given level. Therefore, the data which the possessor of the card does not wish to let other persons know can be kept secret from third persons.

(7) A third person who is qualified classfies the data into those registered to the card and those registered to the administration center, so that when a medical doctor uses the data, the labor and cost can be reduced for making access to the center through a communication circuit.

What is claimed is:

1. In an integrated circuit card having a memory with a plurality of transaction memory areas, each adapted for storing data related to an associated data source, and a like plurality of authorization memory areas, one authorization memory area uniquely associated with each transaction memory area; input/output means for receiving data from and transmitting data to a data source; and processor means for exchanging data with said input/output means and with said memory and for processing data; the improvement wherein said processor means includes:

input means for receiving data from a data source;

acquiring means responsive to input from the data source of an enabling code unique to that data source for acquiring an encrypted code from the one of said authorization memory areas associated with the transaction memory area that is associated with that data source;

means for calculating an authorization code from data stored in said associated transaction memory area;

means for comparing the acquired encrypted code with the calculated authorization code;

means responsive to a proper comparison for permitting receipt of transaction data from the data source; and means responsive to receipt of transaction data from the data source for writing of transaction data into said associated transaction memory area to update data stored therein and for updating the encrypted code in said authorization memory area, thereby preventing access to said associated transaction memory area if the data therein has been altered without authorization.

2. The improvement of claim 1 wherein said processor means further includes means responsive to receipt of a master enabling code and receipt of a signal indicating a selected transaction memory area for permitting processing of data from and writing of data into said selected transaction memory area, thereby permitting access to the selected transaction memory area.

3. An integrated circuit card comprising:

input/output means;

a memory having a plurality of memory areas, each memory area adapted for storing data and having assigned thereto a permission level;

first means defining a personal identification code storage area for storing personal identification codes;

second means defining a license code storage area for storing license codes;

third means defining a permission code storage area for storing permission codes, each permission code indicating a permission level for access to data stored in said memory; and fourth means responsive to application to said input/output means of a license code and a personal identification code for interrogating said storage areas, comparing the applied license code with stored license codes, comparing the applied personal identification code with stored personal identification codes, and when proper comparisons are found, obtaining from said third means a permission code and making available to said input/output means, for application to an external device, data stored in said memory having an assigned permission level not greater than the permission level indicated by the obtained permission code.

4. In an integrated circuit card having a memory with a transaction memory area, for storing data from a data source, and an authorization memory area; input/output means for receiving data from and transmitting data to a data source; and processor means for exchanging data with said input/output means and with said memory and for processing data; the improvement wherein said processor means includes:

input means for receiving data from a data source;

means responsive to input of an enabling code from the data source for acquiring an encrypted code from said authorization memory area;

means for calculating an authorization code from data stored in said transaction memory area;

means for comparing the acquired encrypted code with the calculated authorization code;

means responsive to a proper comparison for permitting receipt of transaction data from the data source; and means responsive to receipt of transaction data from the data source for writing of transaction data into said transaction memory area to update data stored therein and for updating the encrypted code in said authorization memory area, thereby preventing access to said transaction memory area if the data therein has been altered without authorization.

* * * * *